(12) United States Patent
Bruun et al.

(10) Patent No.: US 11,523,402 B2
(45) Date of Patent: Dec. 6, 2022

(54) RECONFIGURING RESOURCES FOR TRANSMISSION

(71) Applicant: NOKIA TECHNOLOGIES OY, Espoo (FI)

(72) Inventors: Rasmus Liborius Bruun, Nørresundby (DK); Nuno Manuel Kiilerich Pratas, Gistrup (DK); Carlos Santiago Morejon Garcia, Aalborg (DK); Lianghai Ji, Aalborg (DK); Ling Yu, Kauniainen (FI); Jakob Lindbjerg Buthler, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/374,215

(22) Filed: Jul. 13, 2021

(65) Prior Publication Data

US 2022/0022195 A1    Jan. 20, 2022

(30) Foreign Application Priority Data

Jul. 15, 2020    (FI) ..................................... 20205755

(51) Int. Cl.
*H04W 72/08* (2009.01)
*H04L 1/16* (2006.01)
(Continued)

(52) U.S. Cl.
CPC ......... *H04W 72/085* (2013.01); *H04L 1/1628* (2013.01); *H04W 28/04* (2013.01); *H04W 28/26* (2013.01)

(58) Field of Classification Search
CPC ... H04W 72/085; H04W 28/04; H04W 28/26; H04W 92/18; H04W 28/0236; H04W 28/0268; H04W 40/22; H04W 72/1263; H04W 4/40; H04W 72/1278; H04L 1/1628; H04L 1/0026; H04L 5/0057; H04L 5/0094; H04L 1/188
See application file for complete search history.

(56) References Cited

U.S. PATENT DOCUMENTS

2020/0275509 A1* 8/2020 Yu .......................... H04L 1/1812
2020/0351707 A1* 11/2020 Cheng ................... H04W 28/04

FOREIGN PATENT DOCUMENTS

| CN | 106165524 A | 11/2016 |
|---|---|---|
| CN | 110972101 A | 4/2020 |

(Continued)

OTHER PUBLICATIONS

Extended European Search Report dated Dec. 16, 2021 corresponding to European Application No. 21185022.7.
(Continued)

*Primary Examiner* — Afshawn M Towfighi
(74) *Attorney, Agent, or Firm* — Squire Patton Boggs (US) LLP (57) ABSTRACT

Apparatus and method in a communication system for reconfiguring resources for transmission are disclosed. More than one sidelink transmissions are transmitted to a second apparatus. It is determined that reception status feedbacks are not received regarding a given number of sidelink transmissions. Transmission resource used for sidelink transmission is reconfigured based on the determination.

18 Claims, 5 Drawing Sheets

(51) Int. Cl.
　　　*H04W 28/04*　　　(2009.01)
　　　*H04W 28/26*　　　(2009.01)

(56) References Cited

FOREIGN PATENT DOCUMENTS

| | | |
|---|---|---|
| CN | 111010264 A | 4/2020 |
| CN | 111277345 A | 6/2020 |
| EP | 3 634 061 A1 | 4/2020 |
| WO | WO 2019/096145 A1 | 5/2019 |
| WO | WO 2020/091458 A1 | 5/2020 |
| WO | WO-2020167773 A1 * 8/2020 ........... H04L 1/1812 |

OTHER PUBLICATIONS

Vivo, Remaining issues on mode 2 resource allocation mechanism, 3GPP Draft; R1-2001661, 3GPP TSG-RAN WG1 Meeting #100bis, e-Meeting, Apr. 10, 2020, XP051873259.

Notification of the First Office Action dated Jun. 27, 2022 corresponding to Chinese Patent Application No. 2021107947820, with English summary thereof.

* cited by examiner

RECONFIGURING RESOURCES FOR TRANSMISSION

FIELD

The exemplary and non-limiting embodiments of the invention relate generally to wireless communication systems. Embodiments of the invention relate especially to apparatuses and methods in wireless communication networks.

BACKGROUND

Wireless communication systems are under constant development. Wireless communication amongst vehicles has been under study during recent years. It has been estimated that development of Intelligent transportation systems, ITS, will improve road safety and traffic efficiency. Communication between vehicles and between infrastructure is a vital part of ITS. Vehicle-to-vehicle communication, V2V, and vehicle-to-infrastructure communication, V2I, will enable communication related to various use cases, such as broadcasting situation awareness messages for assisted driving, sending emergency alerts (braking and vulnerable road user detection, for example) to increase safety, executing cooperative manoeuvres such as lane merging or platooning and more.

Vehicular connectivity over cellular technology, such as cellular system developed by Third Generation Partnership Project, 3GPP, is denoted as Cellular Vehicle to Everything, C-V2X. It is being standardized along with the development of 5G (or New Radio, NR) communication system. Direct Vehicle to Vehicle communication without a link via a Radio Access Network, RAN, node, is denoted as sidelink.

WO2020091458 discloses a method for selecting transmission carrier. EP3634061 discloses a solution for requesting resource for sidelink retransmission.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus of claim 1.

According to an aspect of the present invention, there is provided a method of claim 9.

According to an aspect of the present invention, there is provided a computer program comprising instructions of claim 14.

One or more examples of implementations are set forth in more detail in the accompanying drawings and the description below. Other features will be apparent from the description and drawings, and from the claims. The embodiments and/or examples and features, if any, described in this specification that do not fall under the scope of the independent claims are to be interpreted as examples useful for understanding various embodiments of the invention.

LIST OF DRAWINGS

Embodiments of the present invention are described below, by way of example only, with reference to the accompanying drawings, in which.

DESCRIPTION OF SOME EMBODIMENTS

Figure 1:
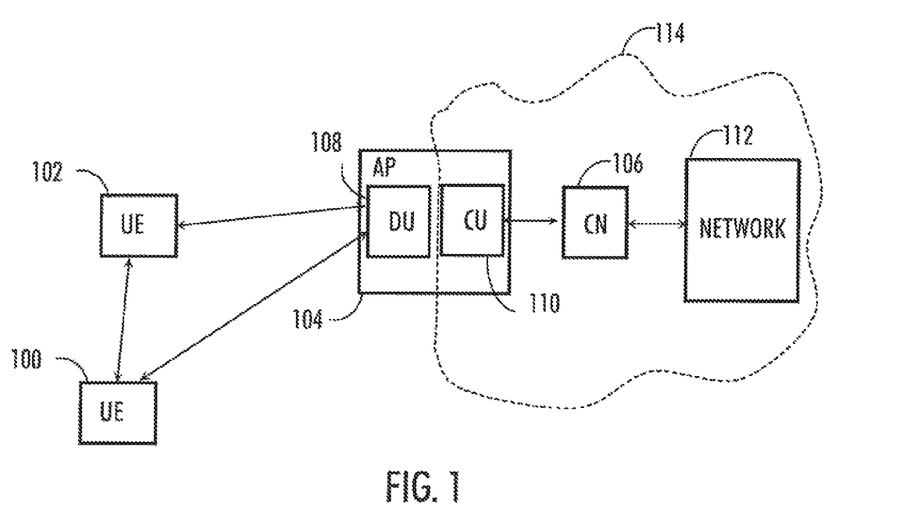
FIGS. 1 and 2 illustrate examples of simplified system architecture of a communication system.

FIG. 1 shows devices 100 and 102. The devices 100 and 102 may, for example, be user devices or user terminals. The devices 100 and 102 are configured to be in a wireless connection on one or more communication channels with a node 104. The node 104 is further connected to a core network 106. In one example, the node 104 may be an access node, such as (e/g)NodeB, serving devices in a cell. In one example, the node 104 may be a non-3GPP access node. The physical link from a device to a (e/g)NodeB is called uplink or reverse link and the physical link from the (e/g)NodeB to the device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to devices. The antenna unit may comprise a plurality of antennas or antenna elements. The (e/g)NodeB is further connected to the core network 106 (CN or next generation core NGC).

The device (also called a subscriber unit, user device, user equipment (UE), user terminal, terminal device, etc.) illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station.

The device typically refers to a device (e.g. a portable or non-portable computing device) that includes wireless mobile communication devices operating with or without an universal subscriber identification module (USIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud. The device (or in some embodiments a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the Long Term Evolution, LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHz-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The technology of Edge cloud may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at or close to a remote antenna site (in a distributed unit, DU 108) and non-real time functions being carried out in a centralized manner (in a centralized unit, CU 110).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells)

which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
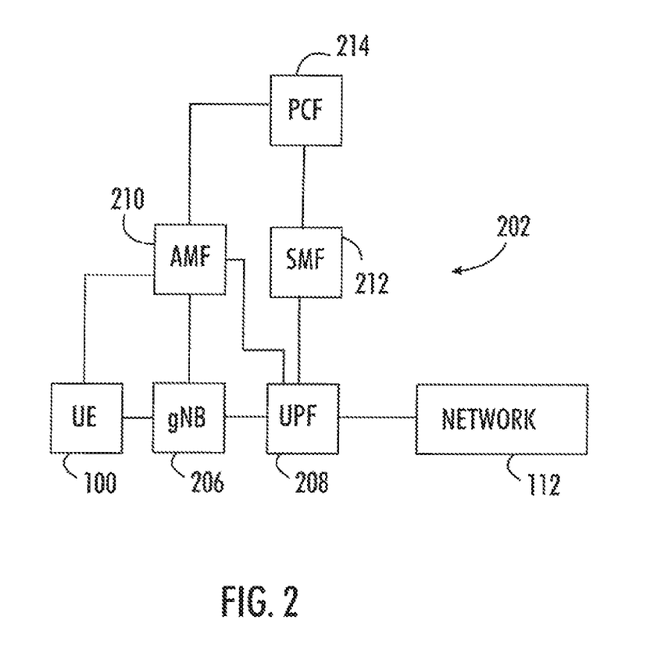

FIG. 2 illustrates an example of a communication system based on 5G network components. A user terminal or user equipment 100 communicating via a 5G network 202 with a data network 112. The user terminal 100 is connected to a Radio Access Network RAN node, such as (e/g)NodeB 206 which provides the user terminal a connection to the network 112 via one or more User Plane Functions 208. The user terminal 100 is further connected to Core Access and Mobility Management Function, AMF 210, which is a control plane core connector for (radio) access network and can be seen from this perspective as the 5G version of Mobility Management Entity, MME, in LTE. The 5G network further comprises Session Management Function, SMF 212, which is responsible for subscriber sessions, such as session establishment, modify and release, and a Policy Control Function 214 which is configured to govern network behavior by providing policy rules to control plane functions.

As mentioned above, in 3GPP direct communication of user terminals or terminal devices not through a RAN node, is denoted as sidelink. In NR release 16 sidelink, there are two modes defined, Mode-1 and Mode 2. In Mode 1, user terminals request resources for sidelink communication from the network. In Mode 2, it is up to the communicating devices to select the resources for communication in an autonomous manner.

For scheduling resources to support vehicle-to-anything (V2X) communication where a large amount of data traffic is periodically transmitted, semi-persistent scheduling (SPS) and configured grant (CG) transmission schemes have been defined in both LTE and NR sidelink. A semi-persistent or a configured grant type of transmission is a transmission recurring with a specified (configurable) period called the resource reservation interval (RRI). It is noted that both NR SL mode-1 (i.e. network allocates the SL transmission resources) and NR SL mode-2 (i.e. UE autonomously selects the SL transmission resources) may use periodical transmissions. Thus, in this document, we use SPS/CG to denote and indicate the periodical transmissions in NR SL mode 1 and/or mode 2 in general, without separating the denotation for periodic transmission from mode 1 and that from mode 2. Information of the sidelink transmission period is transmitted in sidelink control information (SCI) over PC5 air interface. The information allows nearby sensing UEs to determine the device future transmissions and select different resource in order to avoid contending with the device transmissions.

In NR sidelink specifications, survival time denotes the time that an application running in UE and utilising a communication service may continue even without an anticipated message. If there is no traffic on the communication service in a time interval longer than survival time, the connection may be released. If receiving UE does not receive anything from transmitting UE inside the survival time, the application layer of the receiving may consider the communication service as unavailable. This may trigger the UE to de-activate the affected service(s).

In NR sidelink communication, it is possible to utilise hybrid automatic repeat request (HARQ) feedback from receiver to transmitter, to enhance reliability. The receiver may send acknowledgment (ACK) or non-acknowledgment (NACK) to the transmitter to indicate if the transmission could be decoded.

In the current procedure to select SPS/CG resources, there may occur a situation where two peer UEs utilising sidelink unicast/multicast for communicating with each other select (or reselect) the same transmission resources with same periodicity. If two UEs start transmission in the same time-domain resource, e.g. in the same Transmission Time Interval (TTI) and utilise a SPS/CG resource with the same periodicity, the periodical transmissions of the two UEs will overlap in the same time-domain resource (e.g. the same TTI. Due to the half-duplex constraint, neither UEs can receive/sense while it is transmitting and, thus, neither UEs can be aware of the SPS/CG transmissions from the peer UE, which would consistently cause the considered periodical transmissions to fail.

Currently there is no fast way of resolving this problem. The current solution is to rely on performing reselection of resources at some time interval, but no active detection of possible overlap in resource usage is performed.

Figure 3:
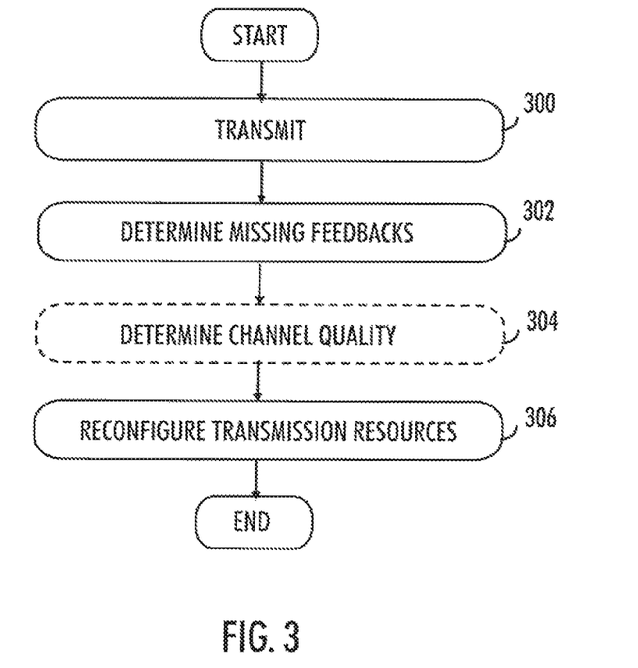
FIG. 3 is a flowchart illustrating some embodiments.

The flowchart of FIG. 3 illustrates an embodiment. The flowchart illustrates an example of the operation of an apparatus. In an embodiment, the apparatus may be a terminal device, a part of a terminal device or any other apparatus capable of executing following steps. In an embodiment, the apparatus is transmitting via periodical resources, e.g. by utilising SPS/CG sidelink communication.

In step 300, the apparatus is configured to transmit more than one sidelink transmission to a second apparatus. The transmissions may be SPS/CG of transmission towards second apparatus.

In step 302, the apparatus is configured to determine that reception status feedbacks (e.g. acknowledgement/non-acknowledgement) from a second apparatus (e.g. the peer receiver of the unicast transmission or at least one peer receiver of the multicast transmission) are not received regarding a given number of sidelink transmissions. In an embodiment, the transmission are consecutive sidelink transmissions. In an embodiment, the given number of missing feedbacks may be regarding either consecutive or non-consecutive sidelink transmissions.

In an embodiment, in step 304, the apparatus may be further configured to determine, based on a transmission or a quality of transmission received from the second apparatus, that missing feedbacks are not due to channel quality between the apparatus and second apparatus. The transmission from the second apparatus may be, for example, acknowledgement/non-acknowledgement to retransmission and/or other sidelink data/control information transmission using a resource out of the collided SPS/CG resource. From this the apparatus may assume/estimate/determine that there may be a conflict regarding resource usage.

In step 306, the apparatus is configured to reconfigure transmission resource used for sidelink transmission based on the determination regarding reception status feedbacks.

In an embodiment, determination regarding channel quality maybe taken into account as well. The resource to be reconfigured may be the detected conflict periodic resources.

In an embodiment, the reconfigured transmission resources may include different time-domain resources comparing to the determined resources where feedbacks are not received regarding a given number of consecutive sidelink transmissions.

In an embodiment, the apparatus may be configured to compare the ID of the apparatus with the ID of the second apparatus and reconfigure transmission resource if the ID of the apparatus is smaller or larger than the ID of the second apparatus.

In an embodiment, the apparatus may be configured to trigger or perform resource reconfiguration based on survival time and Resource Reservation Interval defined for the service or system.

In an embodiment, the resource reconfiguration may be performed by the apparatus autonomously, e.g. if the apparatus applies NR SL mode 2. Alternatively, if the apparatus is assigned its SL resources by another entity (e.g. network in NR SL mode 1), the apparatus may send a message to the resource allocation entity and obtains a resource reconfiguration from that entity accordingly.

Figure 4:
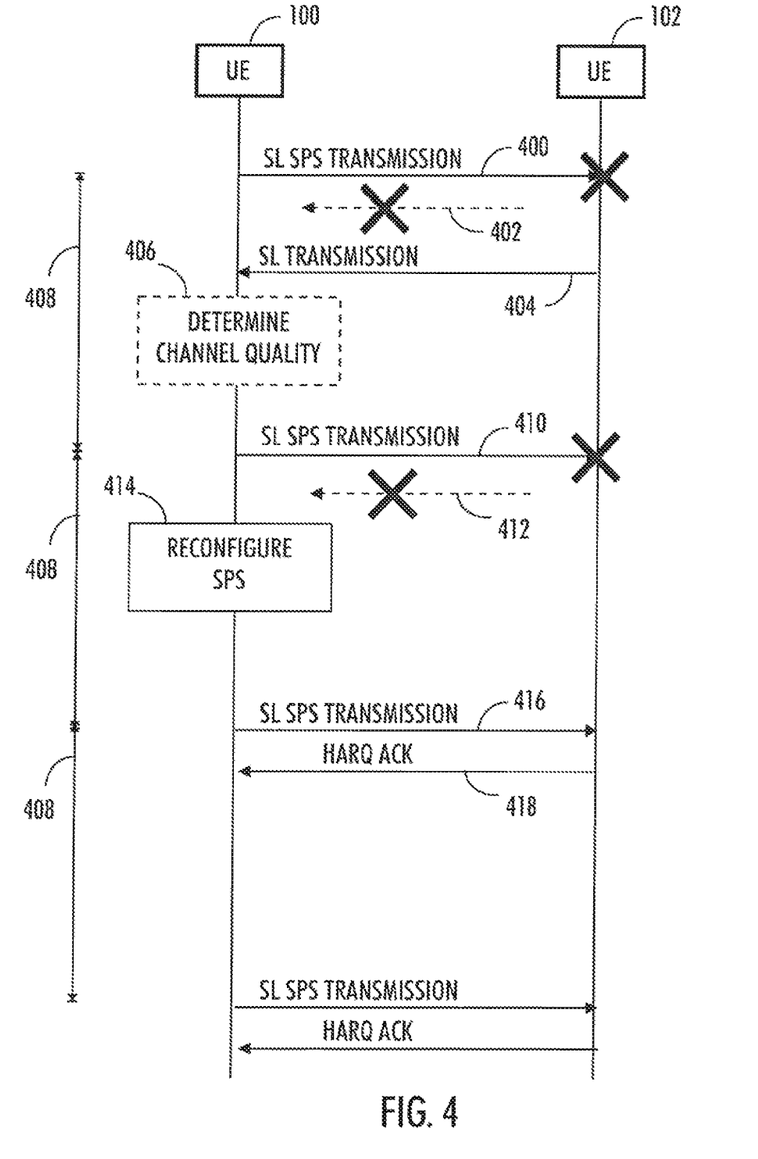
FIG. 4 is a signalling chart illustrating an embodiment.

FIG. 4 is a flowchart illustrating an example. The chart illustrates the operation the apparatus 100 and communication with the second apparatus 102.

The apparatus 100 sets up an SPS/CG type of periodic transmission 400 towards the second apparatus 102. In this example, there is an overlapping of the SPS/CG type of periodic transmission in time domain from the second apparatus. In other words, the two periodic transmissions from the apparatus and the second apparatus, respectively, will continuously overlap in time domain. Thus, due to the half-duplex restrict, the second apparatus is unaware of the transmission from apparatus 100 UE1 and provides no HARQ feedback 402. Thus, UE1 does not receive HARQ feedback 402 on the first transmission.

The apparatus 100 is configured to determine internally that the HARQ feedback for the communication towards the second apparatus is missing, e.g. no HARQ feedback is received from the determined PSFCH resource.

The second apparatus 102 may transmit a transmission 404 to the apparatus 100. The transmission may be an acknowledgement/non-acknowledgement to a retransmission and/or other sidelink control/data information transmission and it uses a resource out of the collided SPS/CG resource used by the apparatus 100.

In an embodiment, the apparatus 100 may be configured to utilise this successful reception 404 to determine 406 that the quality of the channel between the apparatuses 100, 102 is good. In addition, the quality of the channel may be further evaluated based on Reference Signal Received Power (RSRP) of the received transmission, for example. It is noted that the mentioned operation of the apparatus 100 in step 406 may happen in any other time instance before the resource reconfiguration (e.g. after 412).

The apparatus 100 is configured to transmit to the second apparatus 102 with a given SPS/CG periodicity 408. Thus, the apparatus 100 transmits a second transmission 410 over the next periodic resource and does not receive HARQ feedback 412 on this transmission.

After transmitting a given number of consecutive transmissions to the second apparatus without receiving HARQ feedback and determining from the transmission of the second apparatus that the channel quality is not the reason for missing feedback, the apparatus is configured to determine that there may be a conflict regarding resource usage. Therefore, the apparatus is configured to reconfigure 414 the SPS/CG transmissions. As an example, the resource reconfiguration may include to reselect a set of periodic resources, which are different from the detected colliding resources in time domain. The resource reconfiguration may be carried out either in the apparatus 100 if it operates in NR SL mode 2, or in a network entity that is triggered by receiving an indication message from the apparatus 100 operating in NR SL mode 1.

After reconfiguration, the apparatus 100 transmits SPS/CG transmission 416 to the second apparatus utilising different resources that is obtained from the resource reconfiguration procedure 414 and, in this example, receives now HARQ feedback 418 from the second apparatus.

In an embodiment, the given number of consecutive transmissions is a system-configured parameter. The number of needed consecutive failed detections of HARQ feedback to trigger an SPS/CG reconfiguration/reselection may be denoted as reconfiguration threshold $\theta_{RC}$.

In an embodiment, the given number of consecutive transmissions $\theta_{RC}$ may depend on the UE ID of the apparatus of UE group member ID, if the apparatus is a member of a group.

In an embodiment, the given number of consecutive transmissions or the reconfiguration threshold $\theta_{RC}$ may be determined utilising the following equation $$\theta_{RC} = \max\left(2, \text{floor}\left(\gamma * \frac{\text{survival time}}{RRI}\right)\right), \qquad \text{(Eq.1)}$$

where $\gamma$ is a system parameter. In an embodiment, it may be configured by a protocol layer (such as PHY, MAC, RRC or V2X/application layer). The protocol layer may dynamically configure the value of $\gamma$ based on quality of service (QoS) requirements of the services utilising sidelink communication, and/or sidelink radio condition, e.g. measured channel busy ratio (CBR). The value of $\gamma$ may not exceed 1, as it will lead to the problem that the peer UE may not successfully receive the data packets in a duration of survival time.

In an embodiment, when the first apparatus 100 determines missing HARQ feedback(s), it may be configured to query the second apparatus for the reason for missing feedback(s). In an embodiment, the query may indicate the periodic transmission resources where the first apparatus 100 transmitted to the second apparatus but did not receive HARQ feedback. Based on the received query, the second apparatus may perform resource reconfiguration if it detects resource collision. Alternatively, the second apparatus may send back a response message to indicate the reason for the first apparatus 100 for missing feedback(s). Accordingly, the first apparatus 100 may reconfigure its periodic resources.

In an embodiment, if both UEs can reconfigure SPS/CG resources, the UE with the highest ID value could be configured to have different value for $\theta_{RC}$, for example $\theta_{RC}{}^{UE2} = \theta_{RC}{}^{UE2} + 1$. This would avoid both UEs performing reselection of overlapping SPS/CG resources at the same time, which may further cause a collision. In this way, configuring the two colliding UEs with different values for $\theta_{RC}$ allow one UE to perform resource reconfiguration before the other one. Thus, the next transmission will not collide anymore, after the first UE's resource reconfiguration.

Figure 5:
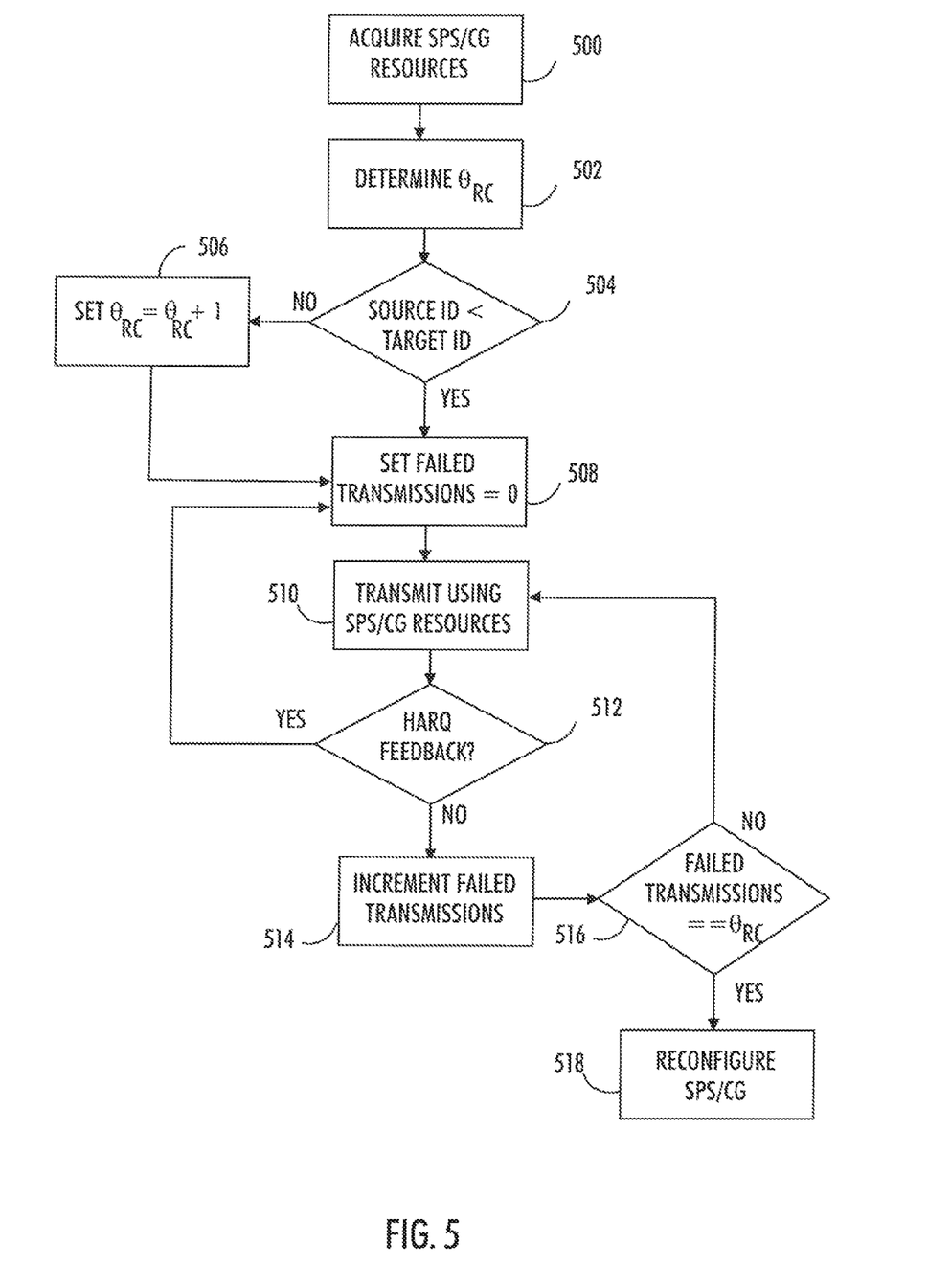
FIGS. 5 and 6 are flowcharts illustrating some embodiments.

FIG. 5 is a flowchart illustrating an embodiment of the operation of the apparatus 100.

In step 500, the apparatus 100 acquires SPC/CG resources for transmission.

In step 502, the apparatus determines the reconfiguration threshold $\theta_{RC}$. In an embodiment, it may be calculated based on equation 1.

In step 504, the apparatus checks if the ID of the apparatus is smaller than the ID of the second apparatus. The ID may be a radio layer and/or application layer ID.

If not, the apparatus is configured to increase in step 506 the value of the reconfiguration threshold $\theta_{RC}$. In an embodiment, the value may be increased according to $\theta_{RC}=\theta_{RC}+1$.

In step 508, the apparatus sets the number of failed transmissions to zero.

In step 510, the apparatus transmits using the acquired SPC/CG resources.

In step 512, the apparatus checks whether HARQ feedback is obtained from the second apparatus 102. If yes, the procedure continues from step 508.

If not, the apparatus increments the number of failed transmissions in step 514.

In step 516, the apparatus checks if the number of failed transmissions equals the reconfiguration threshold $\theta_{RC}$.

If not, the procedure continues in step 510 by transmitting using the acquired SPC/CG resources.

If yes, the apparatus is configured to reconfigure SPS/CG resources in step 518.

Figure 6:
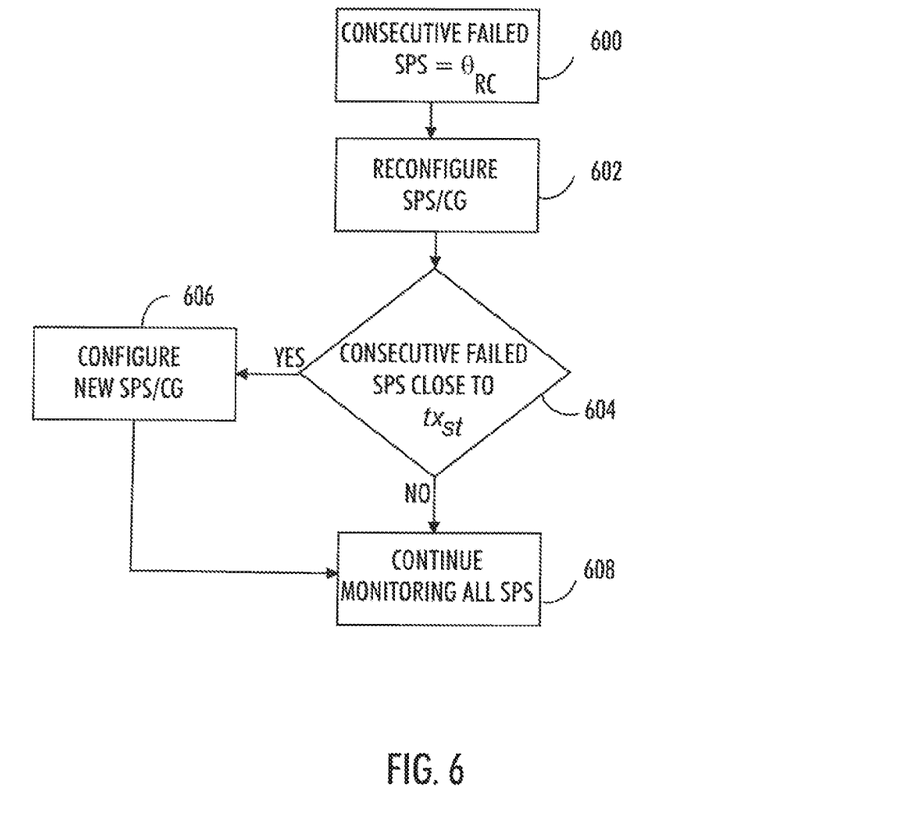

FIG. 6 is a flowchart illustrating an embodiment of the operation of the apparatus 100. In an embodiment, the type of reconfiguration may depend on the survival time and/or the resource reservation interval RRI. The ratio of survival time and RRI may be defined as $$tx_{st} = \frac{\text{survival time}}{RRI}. \qquad (Eq. 2)$$

In step 600, the apparatus 100 has determined that the number of consecutive transmissions with missing HARQ feedback has reached the reconfiguration threshold $\theta_{RC}$.

In step 602, the apparatus 100 reconfigures SPS/CG resources. The reconfigured SPS/CG resources may be used to carry out the future sidelink transmissions. It is noted, if there is/are still collision(s) after the resource reconfiguration 602 at the apparatus 100, the number of missing HARQ feedbacks will increase.

After the reconfiguration 602, the apparatus 100 uses the reconfigured resource(s) for sidelink transmission(s) and monitor the corresponding reception status feedback(s) from the peer UE.

In step 604, the apparatus 100 continuously checks whether the $tx_{st}$ is much greater than the number of consecutive transmissions with missing HARQ feedbacks which may include missing HARQ feedbacks before and/or after the reconfiguration at 602. In practise, it is checked whether $tx_{st}$ is greater than the number of the missing HARQ feedbacks with a given predetermined margin, for example.

If yes, the apparatus is configured to in step 608 continue with the reconfigured SPS/CG resources.

If not, i.e. value of the $tx_{st}$ is close to the value of the missing HARQ feedbacks, the apparatus is configured to configure in step 606 at least one set of new resources for transmission, in addition to the current SPS/CG resources. In this case, where the number of consecutive transmissions with missing HARQ feedback is close to $tx_{st}$, multiple sets of SPS/CG may be configured. In other words, from step 606, there are at least two sets of SPS/CG resources available for use at the apparatus, i.e. the current SPS/CG reconfigured onstep 602 and additional SPS/CG configuration(s) performed in step 606. Upon successful reception, e.g. of HARQ feedback(s), using one set of the newly (re)configured SPS/CG transmission, the other set(s) of SPS/CG resources may be discarded. This provides additional reliability improvement by using multiple SPSs/CGs in the urgent case when the survival timer is going to expire soon.

Figure 7:
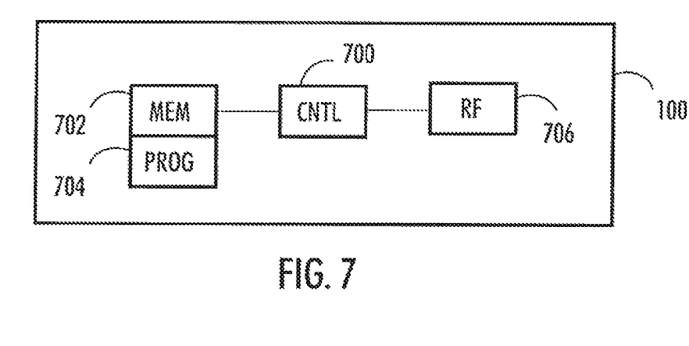
FIG. 7 illustrates an example of an apparatus.

FIG. 7 illustrates an embodiment. The figure illustrates a simplified example of an apparatus applying embodiments of the invention. In some embodiments, the apparatus may be user equipment or terminal device 100 or a part of user equipment or a terminal device.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus 100 of the example includes a control circuitry 700 configured to control at least part of the operation of the apparatus.

The apparatus may comprise a memory 702 for storing data. Furthermore, the memory may store software 704 executable by the control circuitry 700. The memory may be integrated in the control circuitry.

The apparatus may comprise one or more interface circuitries 706, The interface circuitries are operationally connected to the control circuitry 700. An interface circuitry 706 may be a set of transceivers configured to communicate with a RAN node such as an (e/g)NodeB of a wireless communication network and/or with another corresponding apparatus utilising sidelink or SPS/CG resources. The interface circuitry may be connected to an antenna arrangement (not shown). The apparatus may also comprise a connection to a transmitter instead of a transceiver. The apparatus may further comprise a user interface.

In an embodiment, the software 704 may comprise a computer program comprising program code means adapted to cause the control circuitry 700 of the apparatus to realise at least some of the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, processing system or a circuitry which may comprise a working memory (random access memory, RAM), a central processing unit (CPU), and a system clock. The CPU may comprise a set of registers, an arithmetic logic unit, and a controller. The processing system, controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst several computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus in a communication system comprising means configured to transmit more than one sidelink transmission to a second apparatus, determine that reception status feedbacks are not received regarding a given number of sidelink transmissions; and reconfigure transmission resource used for sidelink transmission based on the determination. In an embodiment, the apparatus comprises means configured to determine, based on a quality of transmission received from the second apparatus, that missing acknowledgements are not due to channel quality between the apparatus and second apparatus.

It will be obvious to a person skilled in the art that, as the technology advances, the inventive concept can be implemented in various ways. The invention and its embodiments are not limited to the examples described above but may vary within the scope of the claims.

The invention claimed is:

1. A first apparatus in a communication system, comprising:
   at least one processor; and
   at least one memory including computer program code, the at least one memory and computer program code being configured, with the processor, to cause the first apparatus to:
   transmit more than one sidelink transmission to a second apparatus;
   determine that reception status feedbacks are not received regarding a given number of sidelink transmissions;
   determine a ratio of survival time to resource reservation interval; and
   reconfigure transmission resource used for sidelink transmission based on the determination by reconfiguring the used resource for transmission if the ratio is larger than the given number of consecutive sidelink transmissions by a given margin.

2. The first apparatus of claim 1, the at least one memory and the computer program code configured to, with the at least one processor, cause the first apparatus further to:
   determine, based on a quality of transmission received from the second apparatus, that missing acknowledgements are not due to channel quality between the first apparatus and the second apparatus; and
   take determination into account in the reconfiguration of transmission resource.

3. The first apparatus of claim 1, the at least one memory and the computer program code configured to, with the at least one processor, cause the first apparatus further to:
   perform reconfiguration based on survival time and Resource Reservation Interval defined for the system or service.

4. The first apparatus of claim 1, wherein the given number of sidelink transmissions is a system-configured parameter.

5. The first apparatus of claim 1, the at least one memory and the computer program code configured to, with the at least one processor, cause the first apparatus further to:
   compare an ID of the first apparatus with an ID of the second apparatus, whose feedbacks regarding the given number of consecutive sidelink transmissions are determined as not received; and
   reconfigure transmission resource if the ID of the first apparatus is smaller than the ID of the second apparatus.

6. The first apparatus of claim 1, the at least one memory and the computer program code configured to, with the at least one processor, cause the first apparatus further to:
   determine a given number of consecutive sidelink transmissions $\theta_{RC}$ as $$\theta_{RC} = \max\left(2, \text{floor}\left(\gamma * \frac{\text{survival time}}{RRI}\right)\right),$$

where $\gamma$ is a system-configured parameter and RRI a resource reservation interval.

7. The first apparatus of claim 1, the at least one memory and the computer program code configured to, with the at least one processor, cause the first apparatus further to:
   determine ratio of survival time to resource reservation interval; and
   perform reconfiguration of transmission resource by reconfiguring the used resource and configuring a set of new resources for transmission and transmit using the resources, if the ratio is closer to the given number of consecutive sidelink transmissions than a given margin.

8. The first apparatus of claim 1, wherein the reconfigured transmission resources may include different time-domain resources comparing to the determined resources where feedbacks are not received regarding a given number of sidelink transmissions.

9. A method in a first apparatus in a communication system, said method comprising the steps of:
- transmitting more than one sidelink transmission to a second apparatus;
- determining that reception status feedbacks are not received regarding a given number of sidelink transmissions;
- determining ratio of survival time to resource reservation interval; and
- reconfiguring transmission resource used for sidelink transmission based on the determination by reconfiguring the used resource for transmission if the ratio is larger than the given number of consecutive sidelink transmissions by a given margin.

10. The method of claim 9, further comprising
determining, based on a quality of transmission received from the second apparatus, that missing acknowledgements are not due to channel quality between the first apparatus and second apparatus and taking determination into account in the reconfiguration of transmission resource.

11. The method of claim 9, further comprising
performing reconfiguration based on survival time and Resource Reservation Interval defined for the system or service.

12. The method of claim 9, further comprising:
- comparing an ID of the first apparatus with an ID of the second apparatus, whose feedbacks regarding the given number of consecutive sidelink transmissions are determined as not received; and
- reconfiguring transmission resource if the ID of the first apparatus is smaller than the ID of the second apparatus.

13. The method of claim 9, further comprising:
determining a given number of consecutive sidelink transmissions $\theta_{RC}$ as $$\theta_{RC} = \max\left(2, \text{floor}\left(\gamma * \frac{\text{survival time}}{RRI}\right)\right),$$

where $\gamma$ is a system-configured parameter and RRI a resource reservation interval.

14. The method of claim 9, further comprising:
- determining a ratio of survival time to resource reservation interval; and
- performing reconfiguration of transmission resource by reconfiguring the used resource and configuring a set of new resources for transmission and transmit using the resources, if the ratio is closer to the given number of consecutive sidelink transmissions than a given margin.

15. The method of claim 9, wherein the reconfigured transmission resources may include different time-domain resources comparing to the determined resources where feedbacks are not received regarding a given number of sidelink transmissions.

16. A non-transitory computer-readable medium, said non-transitory computer-readable medium storing instructions which, when executed on a first apparatus, cause the first apparatus to at least perform:
- transmitting more than one sidelink transmission to a second apparatus;
- determining that reception status feedbacks are not received regarding a given number of sidelink transmissions;
- determining ratio of survival time to resource reservation interval; and
- reconfiguring transmission resource used for sidelink transmission based on the determination by reconfiguring the used resource for transmission if the ratio is larger than the given number of consecutive sidelink transmissions by a given margin.

17. The non-transitory computer-readable medium of claim 16, the medium storing instructions which cause the first apparatus further to perform:
- determining, based on a quality of transmission received from the second apparatus, that missing acknowledgements are not due to channel quality between the first apparatus and the second apparatus; and
- taking the determination into account in the reconfiguration of transmission resource.

18. The non-transitory computer-readable medium of claim 16, the medium storing instructions which cause the first apparatus further to perform:
- comparing an ID of the first apparatus with an ID of the second apparatus, whose feedbacks regarding the given number of consecutive sidelink transmissions are determined as not received; and
- reconfiguring the transmission resource if the ID of the first apparatus is smaller than the ID of the second apparatus.

* * * * *